United States Patent [19]
Miyairi

[11] Patent Number: 5,700,501
[45] Date of Patent: Dec. 23, 1997

[54] INJECTION MOLD FOR MOLDING DISCS

[75] Inventor: Kazuki Miyairi, Nagano-ken, Japan

[73] Assignee: Nissei Plastic Industrial Co., Ltd., Nagano-ken, Japan

[21] Appl. No.: 593,829

[22] Filed: Jan. 30, 1996

[30] Foreign Application Priority Data

Jan. 31, 1995 [JP] Japan .................. 7-034538

[51] Int. Cl.$^6$ .................................... B29C 45/38
[52] U.S. Cl. .................. 425/577; 264/106; 425/810
[58] Field of Search ................... 425/810, 577; 264/106

[56] References Cited

U.S. PATENT DOCUMENTS 5,330,693 7/1994 Takada ........................... 425/810

*Primary Examiner*—Tim Heitbrink
*Attorney, Agent, or Firm*—Weingarten, Schurgin, Gagnebin & Hayes LLP

[57] ABSTRACT

An injection mold for molding discs is provided, wherein the injection mold comprises a base die, a board fitted inside the base die, a stamper in the form of a doughnut fitted to the front surface of the board, an outer ring fitted to the front end of the base die, and a sleeve having a flange fitted to the center of the board, the ring and/or the flange fixing the stamper to the board. The injection mold further comprises a thin disc thicker than the stamper interposed closely between the stamper and the board so as that the front surface of the thin disc contacts with the back surface of the stamper. According to the thus constructed injection mold of the present invention, it is possible to prevent dust or dirt from sticking when the stamper is replaced in the field, and to make it unnecessary to replace the mirror surface board, by mounting the combination of the stamper and thin disc on the mold.

2 Claims, 3 Drawing Sheets

5,700,501

INJECTION MOLD FOR MOLDING DISCS

BACKGROUND OF THE INVENTION

1. Field of the Invention

The present invention relates to a mold for injection molding of compact discs, video discs or other discs for recording information.

2. Background Art

FIG. 4 of the accompanying drawings shows the fixed side of a conventional injection mold for molding discs. The mold includes a base die 1 having a seat 1a. Fitted inside the base die 1 are a board 2 and an insert 3 in contact with each other. The front surface of the board 2 is finished as a mirror surface, and therefore the board 2 is generally referred to as a mirror surface board.

The board 2 has a center hole formed through it, into which a sleeve 6 is inserted from the front side. The sleeve 6 may be fixed to the board 3 with screws (not shown). The sleeve 6 has a flange 5 formed on its one open end for holding the inner periphery of a stamper 4 like a doughnut. The outer periphery of the stamper 4 is held by a ring 7, which is fixed to the front end of the base die 1 removably with machine screws 8 or the like.

A receiver 9 for the sleeve 6 projects from the insert 3 through the hole of the board 2. A sprue bush 10 is inserted from the seat 1a of the base die into the center of the receiver 9.

With the sleeve 6 and ring 7 removed, the stamper 4 is fitted on the mirror surface of the board 2, after the mirror surface is cleaned. The fitting is carried out by putting the center hole of the stamper 4 around the sleeve 6, and then inserting the sleeve 6 into the center hole of the board 2. The sleeve 6 serves as a guide which makes the stamper 4 contact with the board 2, and its flange 5 holds the inner periphery of the stamper 4. Thereafter, the ring 7 is fixed to the base die 1, so as to hold the outer periphery of the stamper 4 and make the back surface of the stamper 4 closely contact with the mirror surface.

When the stamper 4 is directly mounted with its back surface in contact with the mirror surface of the board 2, as stated above, any flaw or the like made in the mirror surface affects the stamper 4 so as to cause a defective bump. This necessitates replacing or repairing the board 2. The replacement necessitates disassembling and reassembling the mold. If there is no spare board, there is a need To remake the board 2.

If the stamper is replaced while the mold is mounted on the molding machine in the field, dust or dirt is liable to enter between the mirror surface and the stamper, and it is difficult to clean the mirror surface before the stamper contacts. Therefore, the stamper is replaced in a clean room or the like after the mold is removed. For production of a small number of discs of many types, the mold must be frequently mounted and removed. This is troublesome even if the mold is small. In addition, for easy mounting and removing, the mold may have a complex structure and is therefore costly.

In general, clearances for escapes of gas are formed in the surfaces of the flange 5 and ring 7 which hold the stamper 4, where the clearances are small enough to prevent molten resin from entering. If the thickness of the stamper 4 is not uniform, the clearances vary. As a result, the escapes of gas may be defective, so that the disc quality is affected.

SUMMARY OF THE INVENTION

The present invention is for solving the conventional problems mentioned above. It is the object of the invention to provide a novel injection mold for molding discs, which can prevent dust or dirt from adhering when the stamper is replaced in the field, and which makes it unnecessary to replace the mirror surface board, by adopting a combination of the stamper and a thin disc, without changing the conventional injection mold structure.

The invention in one aspect is an injection mold comprising a base die, a board fitted inside the base die, a stamper in the form of a doughnut fitted to the front surface of the board, an outer ring fitted to the front end of the base die, and a sleeve having a flange formed on its one open end fitted to the center of the board, where the ring and/or the flange fix the stamper to the board. A thin disc being thicker than the stamper is interposed closely between the stamper and the board. The front surface of the thin disc is finished as a mirror surface and contacts with the back surface of the stamper.

The invention in another aspect is an injection mold comprising a base die, a board fitted inside the base die, a stamper in the form of a doughnut fitted to the front surface of the board, an outer ring fitted to the outer periphery of the front surface of the board, and a sleeve having a flange formed on its one open end fitted to the center of the board, where the ring and/or the flange fix the stamper to the board. A thin disc being thicker than the stamper interposed closely between the stamper and the board. The front surface of the thin disc is finished as a mirror surface and contacts with the back surface of the stamper.

It is possible to put the front mirror surface of the thin disc closely on the back surface of the stammer, in advance before carrying and mounting the stamper. This prevents dust or dirt from sticking to the mirror surface when the stamper is replaced. It is therefore easier to replace the stamper while the mold is mounted on the molding machine.

BRIEF DESCRIPTION OF THE DRAWINGS

Preferred embodiments of the present invention are shown below in detail with reference to the accompanying drawings, in which.

DETAILED DESCRIPTION OF THE PREFERRED EMBODIMENTS

Figure 1:
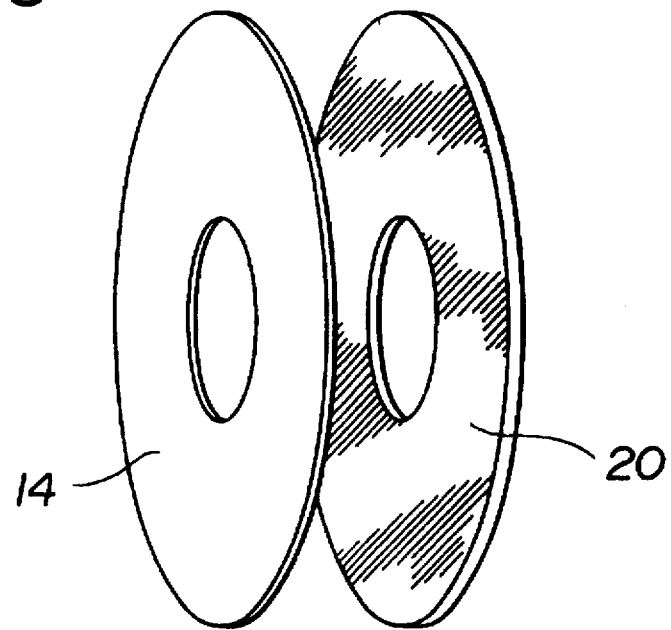
FIG. 1 is perspective views of a stamper and a thin disc for use with an injection mold for molding discs in accordance with the invention.
Figure 2:
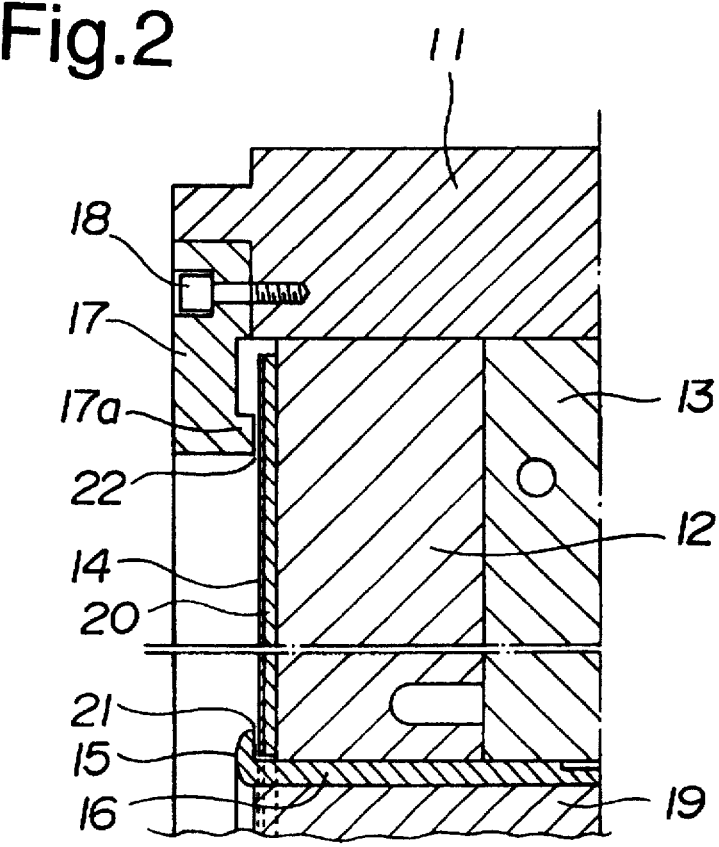
FIG. 2 is a partial view in axial cross section of the injection mold according to the invention.

With reference to FIGS. 1 and 2, the injection mold includes a base die 11. Fitted inside the base die are a board 12 and a insert 13 in contact with each other. The board 12 has a flatly finished front surface and a center hole formed through it.

Figure 4:
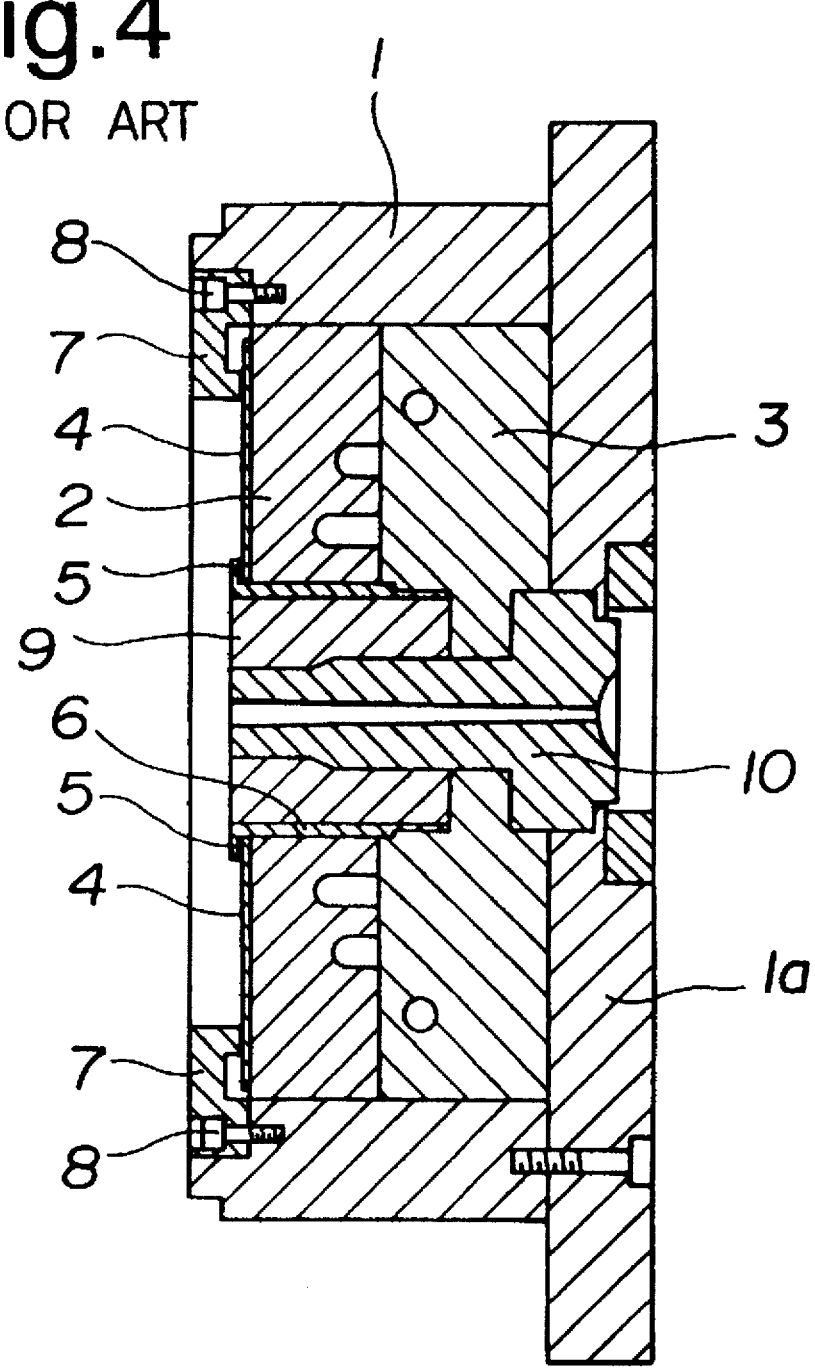
FIG. 4 is a schematic view in axial cross section of the fixed side of the conventional injection mold for molding discs.

A sleeve 16 is inserted into the hole of the board 12 from the front side, and may be fixed with screw (not shown). The sleeve 16 has a flange 15 formed on its one open end for holding the inner periphery of a stamper 14 like a doughnut. The sleeve 16 surrounds a receiver 19. Similarly to FIG. 4, a sprue bush (not shown) is inserted into the center of the receiver 19.

An outer ring 17 is fixed to the front end of the base die 11 removably with machine screws 18 or the like. The ring 17 has a rim 17a projecting axially inward from its inner periphery for holding the outer periphery of the stamper 14.

A thin disc 20 is of the same shape as the stamper 14, but thicker (for example, 0.3~1.0 mm) than it. The thin disc 20 may be made of hard metal, sintered hard alloy, ceramic or the like. The front surface of the thin disc 20 is finished as a mirror surface. The thin disc 20 is used with its front surface closely on the back surface of the stamper 14. The stamper 14 is carried together with the thin disc 20 to the mold, and fitted to the flatly finished surface of the board 12 with the thin disc 20 interposed between them.

The fitting of the stamper 14 through the thin disc 20 is carried out when the sleeve 16, which has the flange 15, and the ring 17 have been removed. First, in a clean room or the like, the stamper 14 and the thin disc 20 are put on each other and then around the sleeve 16, and carried together with it to the mold. Similarly to the prior art, the sleeve 16 is inserted into the center hole of the board 12, until the thin disc 20 contacts with the board 12, and the flange 15 holds the inner periphery of the stamper 14. Thereafter, the ring 17 is fitted to hold the outer periphery of the stamper 14. Thus, the stamper 14 is fitted to the board 12 with the thin disc 20 interposed closely between the stamper 14 and the mirror surface of the board 12.

Figure 3:
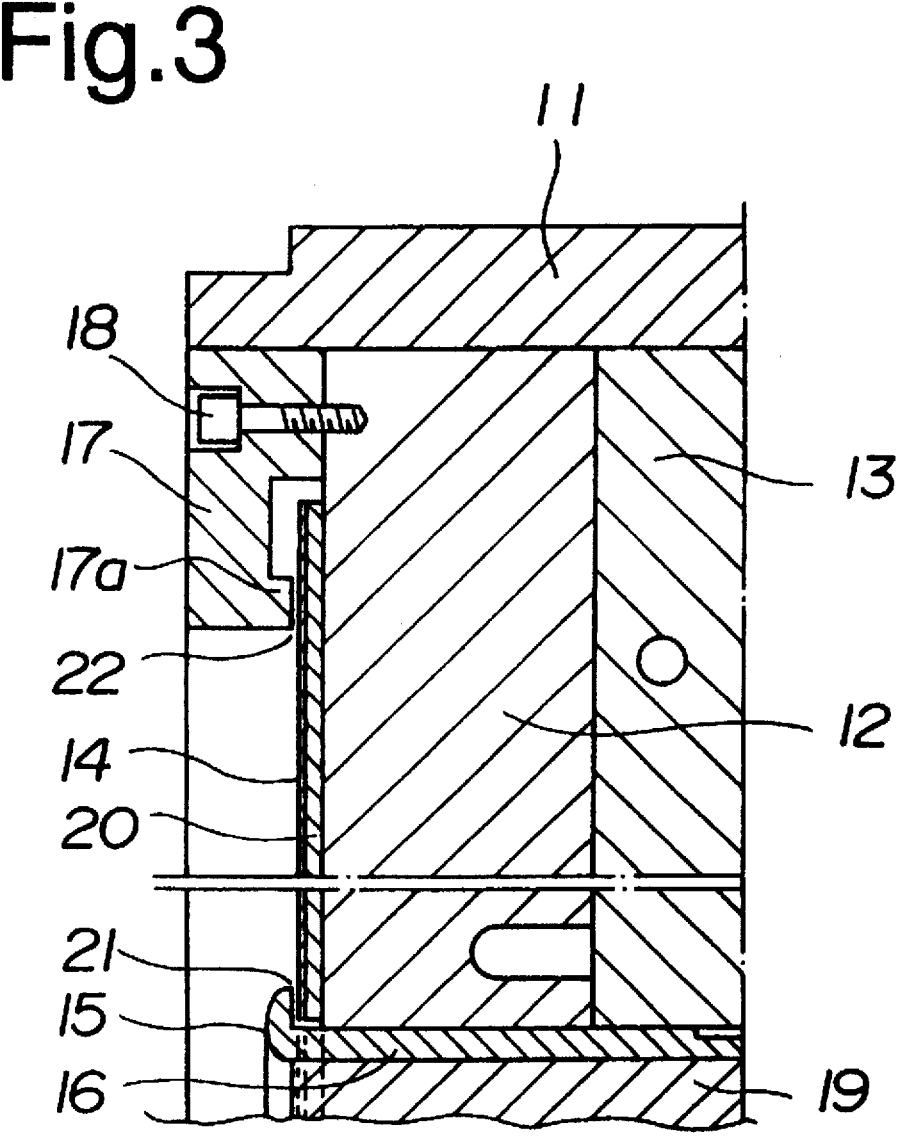
FIG. 3 is a partial view in axial cross section showing another embodiment of the invention.

In the embodiment shown in FIG. 3, a ring 17 is fixed to the outer periphery of the front surface of a board 12. Even after the board 12 is removed from the base die 11, the stamper 14 is still fitted to the board 12 together with the thin disc 20 by the ring 17, and can therefore be carried with the board 12.

In each of the embodiments, similarly to the prior art, the flange 15 and ring 17 are adapted to hold the stamper 14 with clearances 21 and 22, respectively, for escapes of gas.

As stated above, the thin disc 20 is thicker than the stamper 14, and its front surface is finished as a mirror surface, which contacts closely with the back surface of the stamper 14. The stamper 14 is fitted to the board 12 of the base die 11 with the thin disc 20 interposed. The present invention therefore has the following advantages.

A. It is possible to carry the stamper to the molding machine, with the stamper back surface closely on the front mirror surface of the thin disc in a clean room or the like. It is also possible to fit the stamper together with the thin disc to the board. This solves the problem that dust or dirt is liable to enter between the mirror surface and stamper when the stamper is replaced in the field. In producing a small number of discs of many types by frequently replacing the stamper, there is no need to remove the mold. This makes the work less troublesome and considerably shortens the replacement time. Also, there is no need of structure for making it easy to mount and remove the mold.

B. The stamper contacts with the mirror surface of, not the board inside the base die, but the thin disc on the stamper back surface. Therefore, even if the mirror surface is damaged or for the maintenance of it, there is a need to replace only the thin disc. There is no need to disassemble and reassemble the mold as conventionally, so that the mirror surface maintenance is easy.

C. Fixed is the total thickness of the stamper and thin disc, which are fitted to the board. Even if different stampers have various thicknesses, it is possible to apply a thin disc of the thickness supplementary to that of each stamper, by providing thin discs of different thicknesses. It is therefore possible to prevent the clearances for escapes of gas from varying due to the various stamper thicknesses.

D. The thin disc is simpler in structure and cheaper than the board, which is constructed so as to bear the injection pressure. It is possible to select a material suitable for the thin disc as a liner or back plate for the stamper. Being a plate, the thin disc can be finished more easily for a mirror surface than the board. It is therefore possible to cheaply mass-produce thin discs, which can be applied immediately to conventional molds.

E. In the embodiment where the ring is fixed to the outer periphery of the front surface of the board, the ring keeps the stamper fitted to the board together with the thin disc even after the board is removed from the mold. It is therefore easy to carry the stamper. In addition, the ring keeps the stamper from being released or dislocated, that dust or dirt may not enter between the stamper and thin disc during transfer. It is also easy to fit the board in the base die.

What is claimed is:

1. An injection mold for molding discs comprising a base die, a board fitted inside said base die, a stamper in the form of a doughnut fitted to the front surface of said board, an outer ring fitted to the front end of said base die, and a sleeve having a flange formed on its one open end fitted to the center of said board, said injection mold characterized in that a thin disc, having a projection substantially similar to that of said stamper and a thickness greater than that of said stamper, is interposed closely between said stamper and said board so that the front surface of said thin disc which is finished as a mirror surface contacts with the back surface of said stamper, wherein at least one of said ring and said flange enables fixing of said stamper and said thin disc to said board.

2. An injection mold for molding discs comprising a base die, a board fitted inside said base die, a stamper in the form of a doughnut fitted to the front surface of said board, an outer ring fitted to the outer periphery of said front surface of the board, and a sleeve having a flange formed on its one open end fitted to the center of said board, said injection mold characterized in that a thin disc, having a projection substantially similar to that of said stamper and a thickness greater than that of said stamper, is interposed closely between said stamper and said board so that the front surface of said thin disc which is finished as a mirror surface contacts with the back surface of said stamper, wherein at least one of said ring and said flange enables fixing of said stamper and said thin disc to said board.

* * * * *